United States Patent

[11] 3,533,372

| [72] | Inventor | Leo Rosenvold<br>Wildrose, North Dakaota 58795 |
|---|---|---|
| [21] | Appl. No. | 684,111 |
| [22] | Filed | Nov. 20, 1967 |
| [45] | Patented | Oct. 13, 1970 |

[54] DEPTH INDICATING DEVICE
1 Claim, 8 Drawing Figs.

[52] U.S. Cl. .................................................. 116/124,
116/114
[51] Int. Cl. ..................................................... G09f 9/00
[50] Field of Search............................................ 116/124,
124.13, 114; 33/126.6; 37/(Consulted);
56/(Consulted)

[56] References Cited
UNITED STATES PATENTS
3,433,309 3/1969 Michaelis et al.............. 172/430

| 2,014,485 | 9/1935 | Themar..................... | 116/124X |
| 2,374,298 | 4/1945 | Nasset....................... | 116/124.13 |
| 2,589,896 | 3/1952 | Toland....................... | 116/124 |
| 2,941,496 | 6/1960 | Leischer..................... | 116/124.13 |
| 3,074,373 | 1/1963 | Katlic........................ | 116/124 |

*Primary Examiner*—Louis J. Capozi
*Attorney*—Robert E. Kleve

ABSTRACT: The invention comprises a depth indicator device having a rotating drum with a mounting plate adapted to attach the drum to a tractor for indicating the depth of an implement being towed behind the tractor. The rotating drum has a rope wound thereon which extends back to the implement and a spring return is provided to return the indicator and to keep a rope taut on the drum.

INVENTOR
Leo Rosenvold

BY Robert E. Kleve
ATTORNEY

Patented Oct. 13, 1970

INVENTOR
Leo Rosenvold

BY Robert E. Kleve
ATTORNEY

DEPTH INDICATING DEVICE

This invention relates to depth indicating devices, more particularly the invention relates to depth indicators for agricultural equipment.

It is an object of this invention to provide a novel rotating drum depth indicator which may be attached to agricultural equipment to indicate the depth the equipment is set.

It is a further object of the invention to provide a novel rotating drum depth indicator which has a rope attached to the rotating drum and to the equipment to be set at a particular depth and the rotation of the drum indicates the depth of the equipment.

Further objects and advantages of the invention will become apparent as the description proceeds and when taken in conjunction with the accompanying drawing wherein.

Briefly stated, the invention comprises a depth indicator device having a rotating drum and a mounting plate adapted to be fixed to an agricultural implement.

The mounting plate has a fixed center shaft mounted thereto with the drum adapted to rotate upon the shaft, a marker is fixed to the outer end of the shaft, and the drum has indicia annularly about the cylindrical surface of the drum and along one side. A rope has one end attached to the drum and adapted to wind about the cylindrical surface of the drum along the other side with the outer end of the rope to be attached to the equipment being set to different depths whereby the movement of the equipment will unwind the rope and cause the drum to rotate with the marker and indicia on the drum indicating the depth of the equipment.

Figure 1:
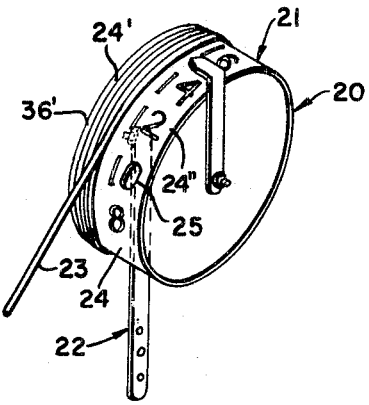
FIG. 1 is a perspective view of the rotating drum depth indicator invention.
Figure 3:
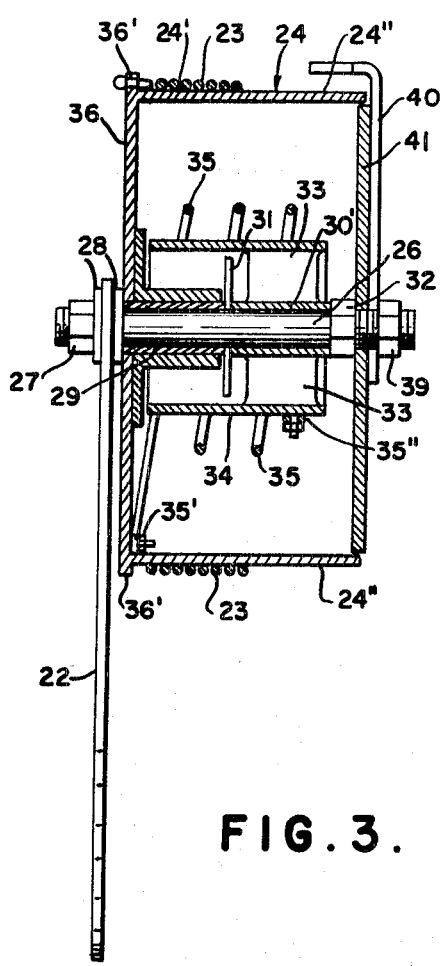
FIG. 3 is a cross-sectional view taken along line 3—3 of FIG. 2.
Figure 2:
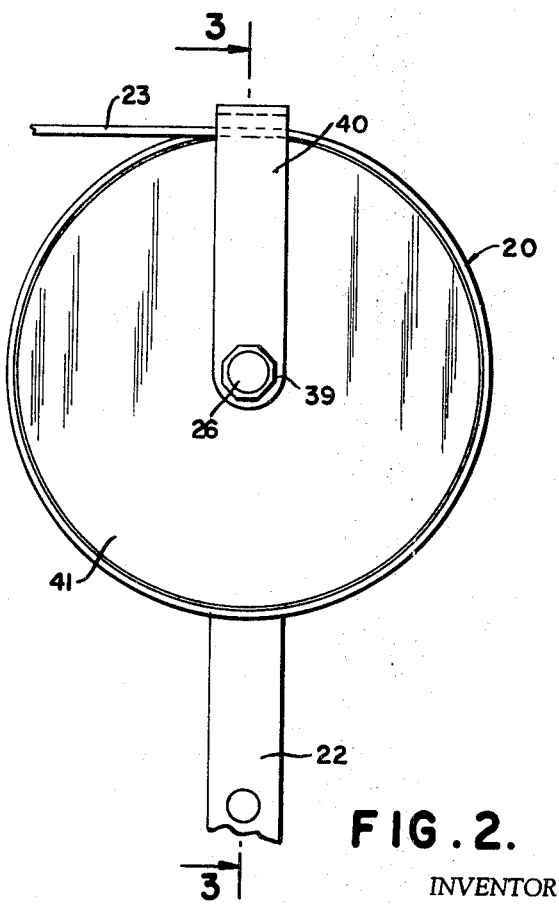
FIG. 2 is a front-elevational view of the rotating drum indicator invention.

Referring more particularly to the drawings in FIG. 1 the rotating drum depth indicator 20 invention is illustrated as having a rotating drum member 21 and a mounting plate 22, with a rope 23 wound about the drum along the one side 24' of the cylindrical surface of the drum 24 and with indicia 25 along the other side 24" of the cylindrical surface of the drum 24. In FIG. 3, the interior construction of the rotating drum invention 20 is illustrated in detail. A central shaft 26 is fixed onto the mounting plate 22 by a nut 27 threaded onto one end of the shaft with washers 28 on the shaft on opposite sides of the mounting plate. A pair of sleeves 29 and 30 are fitted over the center shaft 26 with a washer 31 fitted therebetween. A nut 32 is threaded onto the shaft against sleeve 30 to tighten the sleeve 29 and 30 and washers 28 and 31 and plate 22 and mounting plate 22 together in fixed relation against the nut 27.

A pair of flanges 33 are fixed to the outside of sleeve 30 and project outwardly from opposite sides. An enlarged sleeve or cylindrical tube 34 is fixed to the flanges 33 in coaxial relation to the sleeve 30 and surrounds the sleeve 30.

A coil spring 35 surrounds and is wound around the sleeve 34 in spaced relation with one end 35' fixed to the annular wall plate 36 of the drum 24 and the outer end 35" fixed to the sleeve 34.

The annular wall plate 36 is formed integrally with the cylinder drum member 24. The annular wall plate has an annular projecting flange portion 36' which projects beyond the outer surface of the drum 24 to provide a ridge. Adjacent the wall plate 36 is an inner sleeve and collar member 37 which has a sleeve portion 37' and an annular flange portion 37" formed integrally with one another. The flange portion 37" fixed to the wall plate 36. The wall plate 36 has a center bore 38 and the sleeve and collar 37 and wall plate are rotatably mounted on the sleeve 29 and thereby rotate with the drum portion 24.

The washer 31 keeps the drum in alignment on the sleeve 29 from one direction and the inner washer 28 keeps the drum in alignment from the opposite direction.

An outside annular wall plate 41 is bolted to the bolt or shaft 26 by a nut 39 and an L-shaped indicator 40 is also bolted to the shaft by nut 39.

The drum indicia 25 along the one side of the drum will be numbered in even numbers beginning with 0, 2, 4, 6, 8, and 10, 12, 14, 16 to make a complete circle.

When the spring 35 is fully expanded the drum will be in a position where the numeral 0 will be under the arrow portion 40' of the indicator 40. The rope 23 will have its one end passed through a bore 36" in the ridge or projecting portion 36' of the wall plate 36, and knotted on the other side. The rope will be wound around the drum 24 along the left side 24' several turns and its outer end connected to the implement to be raised and lowered in taunt relation. When the implement is fully raised and in operation as the implement is lowered it will pull the rope 23 with it causing the rope to unwind and the drum to rotate winding up the spring 35. The level the implement has been lowered can be determined by the number on the drum under the arrow of the indicator.

The annular projecting ridge 36' will prevent the coils of the rope from sliding off the one side 24'.

As the drum 24 rotates the sleeves 29 and 30 and 34 and the wall plate 41, indicator 40, nuts 32 and 39, and shaft 26, mounting plate 22, washers 28, a nut 27 will remain stationary. The fact that the outer end 35' of the spring will remain stationary relative to the rotating wall plate 36 and drum portion 24 will cause the spring to wind up creating a spring biased action against the drum urging the drum to rotate and unwind the spring.

A modified form of depth indicator invention 55 is illustrated in FIGS. 4—7 having a rectangular housing 42 with a shaft 43 running through the housing and rotatably mounted in bores 44 and 44' of the housing. A spool 45 has an internal collar 46 fixed to the shaft 43 with an annular wall plate 47 formed integrally with a collar portion 46 and an annular outer sleeve 48 is formed integrally with the wall plate 47 with outturned annular flange 49 which acts to confine the cord 50 onto the sleeve 48. A second annular disc member 51 is mounted about the collar 46 and acts to confine the cord 50 on the sleeve 48 from the other side and a third annular disc member 52 is mounted about a collar 46 and a flat coil spring 53 is wound about the collar 46 between disc members 51 and 52. The pulling of the cord 50 causes the collar 46 and sleeve 48 and flange 49 and wall plate 47 to rotate clockwise unwinding the rope from the sleeve portion 48. The discs 51 and 52 being fixed to the collar 46 rotate with the collar 46. The inner end 53' of the coil spring is secured to collar 46 and the outer end 53" is secured to the housing 42 whereby the rotation of the collar 46 by the unwinding of cord 50 winds the coil spring 53.

Threaded onto the outer end of shaft 43 is a threaded nut 54 and an elongated plate 75 is fitted over the shaft 43 against the nut 54. A second nut 56 is threaded onto shaft 43 against the indicator 75 and holds the indicator in fixed relation to the shaft 43 between nuts 54 and 56. The cord 50 is wound clockwise onto the sleeve 48 of the spool 45 when viewed from FIG. 5 with the inner end 50' fixed to the wall plate 51 and the outer end of the cord 50" extends out through an opening 57 in the bottom of housing 42.

The modified depth indicator invention 55 is mounted to the dashboard of a conventional tractor 59 ahead of the driver's seat 59' so that the operator may view the indicator while driving forward without having to look back.

The rope 50 in the indicator 55 extends downward through the opening 57 in the housing 42 through a flexible conduit 65 which conduit 65 has its upper end 65' mounted to the housing 42 and extends downward to the floor of the tractor and makes a 90° bend with the rearward end 65" of the conduit being fixed to the floor of the tractor adjacent the eyelet 60. The eyelet 60 is mounted to the rear of the tractor and the rope 50 extends downward through the conduit 65 and through the eyelet 60 and on to the portion of the implement towed behind the tractor which is being raised and lowered relative to the implement frame where the rearward end of the rope is tied to said portion whereby if the implement portion such as a plow bottom is being lowered it will pull the rope clockwise out of the housing 42 when viewed from FIG. 5 causing the spool 45 and indicator 75 to rotate clockwise with the indicator 75 moving to one of the numerals 1—11 painted on the face 42' thereby indicating numerically the depth the plow bottom has been lowered.

Figure 5:
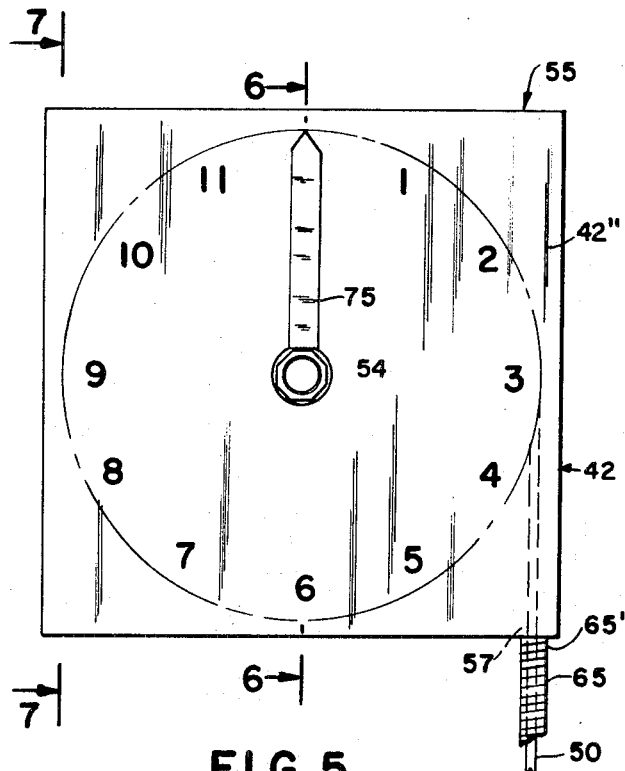
FIG. 5 is a front-elevational view of the modified form of the depth indicator invention.

The coil spring 53 urges the spool 45 counterclockwise in the housing when viewed from FIG. 5 and thereby causes the cord to rewind on the spool when the plow bottom is raised and moves the indicator 75 counterclockwise back towards its vertical upright position shown in FIG. 5.

Figure 8:
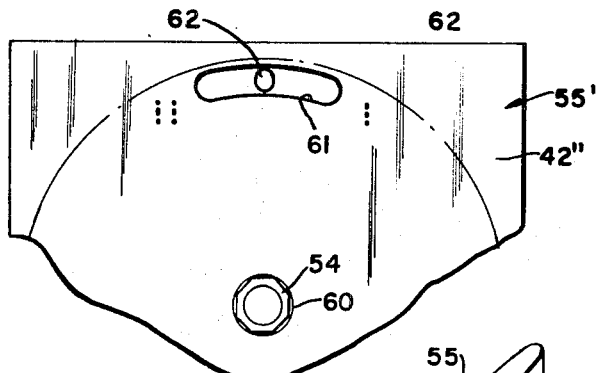
FIG. 8 is a fragmentary-front view of a third modified form of a depth indicator invention.
Figure 4:
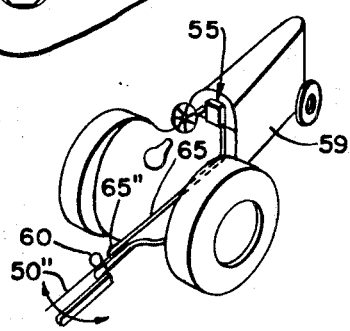
FIG. 4 is a perspective view of a modified form of depth indicator invention shown attached to a tractor.
Figure 6:
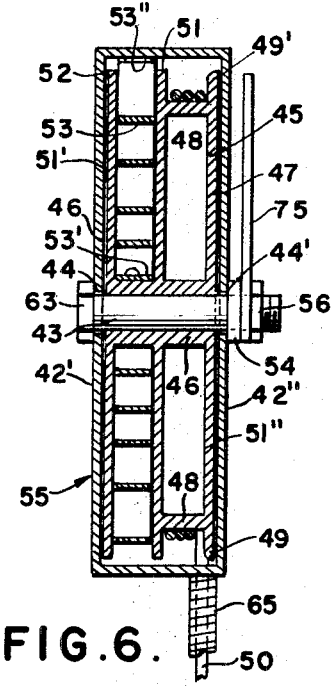
FIG. 6 is a cross-sectional view taken along line 6—6 of FIG. 5.
Figure 7:
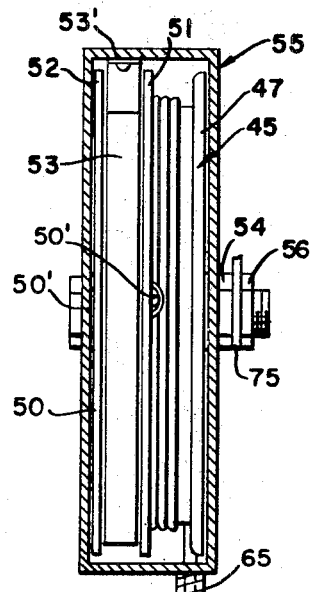
FIG. 7 is a cross-sectional view taken along line 7—7 of FIG. 5.

In the third modified form of the invention 55' shown in FIG. 8 the structure is identical to the modified form shown in FIGS. 4—7 except that the indicator 75 is removed and a washer 60 is inserted in place thereof. An arcuate slot 61 is cut in the wall 42' of the housing and the numerals 62 are painted on the wall plate 47 and spaced in a circular manner about the outer edge thereof whereby when the rope 50 is wound or unwound from the spool, the numeral will appear in the slot indicating numerically a change in depth of the plow bottom.

The shaft 43 has an enlarged head 63 limiting the movement of the shaft axially in one direction and the nut 56 when tightened against the indicator 75 becomes locked on the shaft 43 and rotates with the shaft along with the indicator 75 with enough space between the nut 54 and the wall 42" so that the nut 54 may rotate relative to the wall 42".

The depth indicator 55 as well as the other forms of the invention may also be used on self-propelled swathers and combines to raise and lower the cutter bar to different heights, by mounting the indicator 55 in front of the steering apparatus on the instrument panel or dashboard of the swather or combine.

Thus, it will be seen that a novel inexpensive depth indicator has been provided for measuring the depth of an agricultural tool.

It will be obvious that various changes and departures may be made to the invention without departing from the spirit and scope thereof and accordingly it is not intended that the invention be limited to that specifically described in the specification or illustrated drawing but only as set forth in the appended claim wherein:

I claim:

1. The combination comprising a depth indicator and a self-propelled tractor vehicle having a seat thereon for an operator to sit while operating said vehicle, and which vehicle is adapted to tow an agricultural implement therebehind which implement has means to raise and lower the implement relative to the ground, said indicator comprising a housing member mounted to said tractor vehicle in front of said operator's seat, said housing member having a front and rear plate with side plates connecting said front and rear plates together, a pulley having a center hub with a central bore therethrough and a pair of annular flanges formed integrally to the opposing ends of said hub, a third intermediate annular flange formed integrally to said hub intermediately between said pair of flanges, said pulley being positioned within said housing between said front and rear plates, a shaft extending entirely through said front and rear plates and through the central bore of the pulley, said shaft being fixed to said pulley with said shaft and pulley being rotatable on said housing, a coil spring wound radially on said hub of said pulley between said one of said pair of flanges and said intermediate flange, a rope wound on said pulley between the other of said pair of flanges and said intermediate flanges, said flanges being open between their outer edges, said coil spring having its inner end attached to said hub and its outer end attached to said housing, said rope having its inner end attached to said hub and its outer end extending out of said housing and adapted to be attached to said raising and lowering means on said implement for raising and lowering the implement, a flexible sleeve mounted to said housing and extending outward from said housing and surrounding said rope, an indicator arm having one end fixed to said one end of said shaft on the outside of the rear plate of said housing, whereby when the implement is lowered the action will pull the rope and unwind it from the pulley which rotates the shaft and thereby rotates the indicator arm with the movement of the arm indicating a change in the depth.